United States Patent [19]

Meyers

[11] 3,768,871

[45] Oct. 30, 1973

[54] VEHICLE HYDRAULIC BRAKE SYSTEM

[75] Inventor: Robert E. Meyers, South Bend, Ind.

[73] Assignee: The Bendix Corporation, South Bend, Ill.

[22] Filed: May 22, 1972

[21] Appl. No.: 255,705

[52] U.S. Cl.................... 303/9, 303/50, 180/79.2 R
[51] Int. Cl......................... B60t 15/04, B60t 13/12
[58] Field of Search.................. 303/21 F, 84 A, 9, 303/13, 50; 180/79.2 R

[56] References Cited
UNITED STATES PATENTS

| | | | |
|---|---|---|---|
| 3,695,731 | 10/1972 | England et al.................. | 303/9 X |
| 2,875,843 | 3/1959 | Price.............................. | 180/79.2 R |
| 3,090,652 | 5/1963 | Hovell............................ | 303/50 X |
| 3,176,467 | 4/1965 | Van House..................... | 303/9 X |
| 3,234,968 | 2/1966 | Frantz............................ | 303/50 X |

Primary Examiner—Robert S. Ward, Jr.
Attorney—Ken C. Decker et al.

[57] ABSTRACT

A vehicle hydraulic system having a power steering gear and a control valve for the steering gear connected in series flow relationship between a pump discharge port and a fluid reservoir. A brake system having first valve means interconnected in the hydraulic return line downstream of the control valve between the control valve outlet and the reservoir for controlling communication to a brake actuating device which includes a piston slidably received in a bore so as to have a brake release position and a brake applied position in the bore and being urged to its brake release position by a predetermined back pressure supply and to its brake applied position by spring means which may be augmented by the predetermined pressure. A second valve means is located in the return line downstream of the control valve outlet port for establishing the predetermined back pressure supply.

10 Claims, 2 Drawing Figures

Patented Oct. 30, 1973

3,768,871

VEHICLE HYDRAULIC BRAKE SYSTEM

BACKGROUND OF THE INVENTION

This invention relates to a vehicle hydraulic system which includes a power steering mechanism having a control valve connected in series flow relationship to the pump and reservoir, and a brake system interconnected between the outlet of the control valve and reservoir including valve means for controlling fluid communication to a brake actuating device equipped with spring means for actuating the device if the hydraulic system should malfunction.

Beginning with the early days of the hydraulic power brake and subsequent introduction of the hydraulic power steering gear, each passing year has seen greater emphasis placed upon the advantages of hydraulic equipment for vehicles, not only from the standpoint of relief from physical exertion in operating the vehicle but also because of the greater safety inherent in this equipment. Although in recent years power steering and braking systems have both been upgraded significantly, some combined installations are connected together to be supplied from a single pump so that the individual systems may not attain their respective peak performances if they are operated simultaneously. That is, one or the other or both of the systems will have less than adequate hydraulic fluid available to effectively operate the equipment. Also some hydraulic systems which utilize spring and hydraulic brake actuators for vehicle braking require a complicated piping system with two pumps, making the cost of such an arrangement prohibitive. Examples of prior art installations are seen in U.S. Pat. Nos. 3,119,235 and 3,599,761 assigned to the common assignee for this invention.

This invention is proposed as a solution to the complexity of previous systems and additionally preserves the effectiveness and integrity of the separate systems even when operated simultaneously.

SUMMARY OF THE INVENTION

A hydraulic brake system having first valve means connected downstream from the outlet port of a steering gear control valve of the series flow type and a brake actuating device of the spring and hydraulic type in which hydraulic pressure maintains the actuator in brake release position and the spring force is augmented by hydraulic pressure in positioning the actuator in brake applied position and second valve means for creating a hydraulic pressure of a predetermined valve for application to the actuator in determining its position as selected by the first valve means.

A hydraulic brake system having a brake actuator capable of hydraulic and spring actuation and first valve means connected downstream from a steering gear control valve for controlling fluid communication to the actuator which has a brake release position and a brake applied position and second valve means downstream of the control valve for developing a predetermined pressure for application to the actuator as determined by first and second positions of the first valve means.

A hydraulic brake system having a brake actuator capable of hydraulic and spring actuation and first valve means connected downstream from a steering gear control valve for controlling fluid communication to the actuator which has a brake release position and a brake applied position and second valve means downstream of the steering gear control valve for developing one valve of predetermined pressure which is applied to the actuator in its brake release position and another higher valve of predetermined pressure which is applied to the actuator in its brake applied position.

DETAILED DESCRIPTION OF INVENTION

Figures 1, 2:
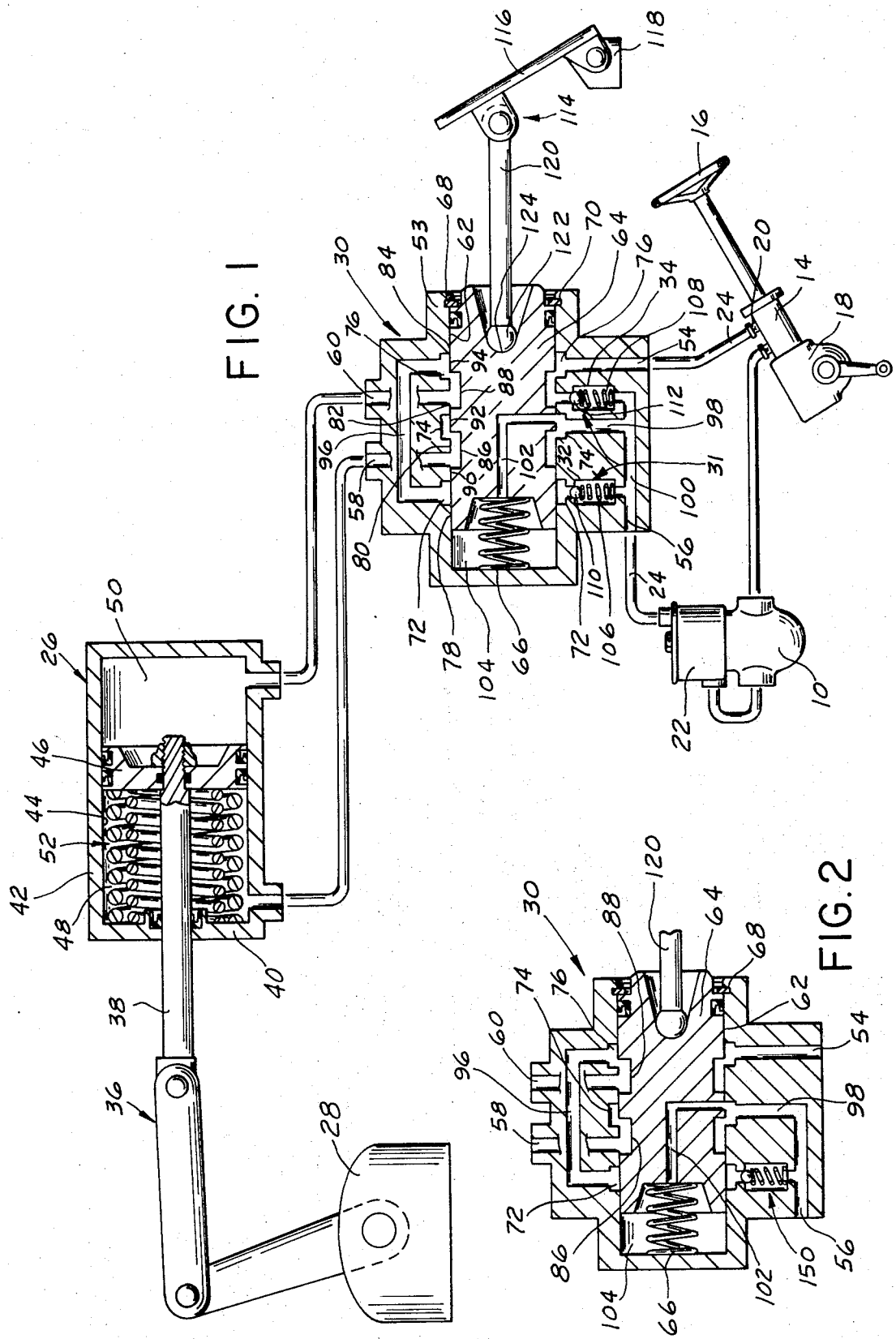
FIG. 1 is a schematic representation of a vehicle hydraulic system showing an arrangement of brake system components according to the present invention.
FIG. 2 is a diagrammatic view of a modified form of valve means as used in the system of the invention.

Referring now to the drawings for a detailed description, FIG. 1 discloses a vehicle hydraulic system comprising a pump 10, having its discharge port connected to an inlet port 12 of a steering gear control valve 14. The control valve 14 is manipulated by a steering wheel 16, which is operatively connected to the valve 14 and to a hydraulic steering gear 18. An outlet port 20 of the control valve 14, is connected to a fluid reservoir 22 through return line 24. The control valve 14 is of the "open center" type as shown in U.S. Pat. No. 1,937,470, permitting continuous flow of fluid therethrough. These are the basic components of the power steering system, the construction and operation of which is well known and needs no further amplification.

The brake system, which is illustrated in FIG. 1, includes a brake actuating device 26 operatively connected to a vehicle brake 28 and first valve means 30 located in the return line 24 for controlling communication between the control valve outlet port 20, the brake actuating device 26 and the reservoir 22. To obtain the desired back pressure supply downstream of the control valve outlet 20 for operating the actuator 26, a second valve means 31, comprising pressure regulating valves 32 and 34, is appropriately connected in the return line 24. This supply pressure, which is of a predetermined value, is applied to the actuator device 26 in manner and for a purpose to be subsequently desired.

The brake actuating device 26 is connected to the vehicle brake 28 through linkage 36 including a rod 38 which extends beyond an end wall 40 of actuator housing 42. The housing 42 is formed with a bore 44, which slidably receives a piston 46 to which the rod 38 is drivably connected. The piston 46 is located in the bore 44 so as to provide opposed chambers 48 and 50. Resilient means 52 acts on one side of the piston 46 urging it to a position within the bore 44 where the brake 28 is applied. Hydraulic back pressure supply of a predetermined value acts in the chamber 50 urging the piston to a brake release position in the bore, as shown in FIG. 1, against the force of the resilient means 52, which latter means is shown as springs located in the chamber 48 and interposed between one side of the piston 46 and the end wall 40.

The first valve means 30 includes a cylinder or housing 53 having an inlet port 54 in communication with the return line 24 downstream of the steering control valve 14, a reservoir port 56 in communication with the reservoir 22 via return line 24 and two work or outlet ports 58 and 60 connected respectively, to the chambers 48 and 50 of the brake actuator 26. A longitudinal bore 62 in the valve cylinder 53 slidingly receives a valve spool 64, retained in a first position in the bore by a spring 66, which urges the spool 64 against retainer ring 68 located in a groove 70 of the bore 62. The bore 62 is furnished with axially spaced apart annular channels or recesses 72, 74 and 76 forming respectively, from left to right, lands 78, 80, 82 and 84. The spool 64 is provided with axially spaced apart annular channels or recesses 86 and 88 forming respectively, lands 90, 92 and 94. A passageway 96 communicates the channel 76, which is in communication with inlet port 54, with the channel 72. The two work ports 58 and 60, in communication with the chambers 48 and 50 respectively, of the brake actuator 26, are in communication with the annular channels 86 and 88. The channel 74 is in continuous communication with the reservoir 22 through passages 98 and 100, the latter passage being connected to the reservoir port 56. A passage 102 communicates chamber 104, which is located in the closed end of the housing 53, with the channel 74 to prevent a build up of fluid pressure in the chamber 104 which would interfere with valve spool movement.

To achieve the desired back pressure supply to operate the brake actuator device 26, the second valve means 31 is connected into the return line 24 so that the pressure regulating valves 32 and 34 are in parallel arrangement, to thereby develop a predetermined back pressure in the respective channels 72 and 88. The value of this back pressure in these two channels is determined by the force of springs 106 and 108 of the valves 32 and 34 respectively. In FIG. 1 the strength of the spring 106 urging ball valve 110 against its seat is greater than that of the spring 108 urging ball valve 112 against its seat. Accordingly the back pressure developed in the channel 72 by the valve 32 is greater than the back pressure developed in the channel 88 by the valve 34. This pressure difference in the two channels is desirable since the predetermined back pressure supply developed by the channel 88 and communicated to the chamber 50, need be only of a value necessary to maintain the piston 46 in its brake release position as shown, when the first valve means 30 is in its first position, also as shown. However, the predetermined back pressure supply to be applied to the chamber 48 to move the piston to its brake applied position should be such as to enhance acceleration of the piston 46 and augment the resilient means 52, when the first valve means is moved to a second position in which the channel 72 communicates its supply pressure to the chamber 48 and the chamber 50 is connected to the reservoir. Accelerating the piston in this manner reduces the time required to bring the vehicle to a stop. The second position of the first valve means 30, which is the brake applying position, is attained through operator-operated means 114 comprising a treadle 116, pivotally supported to a fixed part 118 of a vehicle for driving a push rod 120 having a spherical end 122 carried in a socket 124 of the spool valve 64. Depressing the treadle 116 moves the spool valve 64, of the valve 30, to the left, as viewed in FIG. 1, against the spring 66, causing actuation of the brake actuator 26.

MODE OF OPERATION

FIG. 1 illustrates the relative positions of the parts of the brake actuating device 26 and the first valve means 30 during brake release. At this time it is to be noted that the spool valve 64 is urged against the retainer ring 68 by the spring 66 so that the channel 76 which is in continuous communication with the outlet port 20 of the steering gear control valve, overlaps the channel 88, the latter of which is in communication with the chamber 50 of the brake actuator via the work port 60. The back pressure supply in the channel 88, which is now acting in the chamber 50, is developed by the pressure regulating valve 34 of the second valve means 31 and is of such a value as to maintain the piston 46 in the position shown, compressing the springs 52. Also, during brake release, the chamber 48 is communicated to the reservoir port 56 of the first valve means via work port 58, channels 86 and 74 and passages 98 and 100. It will be observed that although the pressure regulating valve 32 develops a predetermined back pressure in the channel 72 during brake release, this pressure is now ineffective since the lands 80 and 90 slidingly overlie one another, thus cutting off communication from the channel 72 to the chamber 48.

To move the piston 46 to its brake applied position, to the right from the position of FIG. 1, the treadle 116 is depressed, causing the spool valve 64 of the first valve means 30 to assume its second position, to the left of the position shown, wherein the channel 88 is cut off from the channel 76 and communicated to the channel 74, having continuous communication with the reservoir 22. This opens the chamber 50 to the reservoir. Sequentially, repositioning of the first valve means in its second position, communicates the chamber 50 to the reservoir 22, and the chamber 48 is connected to the predetermined back pressure supply existing in the channels 72 and 86, which channels now overlap since the land 90 has slidingly disengaged the land 80. Land 92 has now slidingly engaged land 80, closing off communication between channels 86 and 74. This relationship of channels and passages, as established in the second position of the first valve means 30, subjects the one side of the piston which is exposed to chamber 48 and on which the resilient means 52 acts to a supply pressure which has been elevated to a predetermined value to augment the action of the resilient means in accelerating the piston to its brake applied position.

The brake system also functions in the event of hydraulic pressure failure in the system. In such a predicament the treadle 116 is depressed as in normal situations of a brake application which requires moving the first valve means to its second position. This valve movement places the chamber 50 of the brake actuator 26 in communication with the reservoir port 56, thus enabling the hydraulic fluid to be freely expelled from the chamber 50 under the sole influence of the resilient means driving the piston to a brake applied position. Although described primarily as a service and emergency brake system, it is understood that the invention is equally applicable to parking brake use through suitable connections with the operator-operated means.

FIG. 2 is a modified form of valve means for use with the system illustrated in FIG. 1. This embodiment is very similar in construction and operation to the preferred form of FIG. 1, except that a single pressure regulating valve 150 is substituted for the second valve means 31 of FIG. 1, which employs two pressure regulating valves. The annular channels and passages of the first valve means 30 remain the same, except that the valve 34 and its by-pass connection to passageway 100 are eliminated, as noted from a comparison of the first valve means 30 of FIG. 1 with FIG. 2. In utilizing the single pressure regulating valve 150, it will be understood that the predetermined back pressure supply developed in the channels 72 and 76, for controlling the brake actuator 26 of FIG. 1, is the same for both chambers 48 and 50. In FIG. 2, the minimum back pressure developed by the second valve means 150 is that required to maintain the piston 46 in its brake release position, as shown in FIG. 1. This same back pressure is communicated to the chamber 48 on the one side of the piston 46 and exhausted from the chamber 50, upon movement of the spool 64 from its first to its second position, as the piston is moved to its brake applied position.

I claim:

1. In a vehicle hydraulic system having a power steering gear and a control valve therefor provided with inlet and outlet ports and having a pump with its discharge port connected to the valve inlet port and a fluid reservoir connected to the valve outlet port through a return line, the improvement which comprises:
   a brake system for the vehicle including a brake actuating device, said device having a housing with a bore formed therein;
   a piston slidably received in the bore and having a brake release position and a brake applied position in the bore;
   resilient means acting on one side of the piston urging the piston to the applied position;
   said bore being in communication with the control valve outlet port and the reservoir via the return line;
   first valve means in the return line for controlling communication from the control valve outlet port to the bore and from the bore to the reservoir; and
   second valve means for developing a predetermined back pressure supply in the return line;
   said first valve means having a first position in which the back pressure supply is communicated to the other side of the piston urging the piston against the resilient means into its brake release position;
   said first valve means also having a second position in which the other side of the piston is communicated to reservoir so that the force of the resilient means acting on the piston moves it to the brake applied position.

2. The improvement in claim 1 wherein the second position of said first valve means further communicates the one side of the piston to the back pressure supply which augments the force of the resilient means acting to move the piston to the brake applied position.

3. The improvement in claim 1 wherein said first valve means is held in its first position by a spring.

4. The improvement in claim 2 wherein said first valve means includes a spool valve slidable in a cylinder between the first and second positions and having annular channels and passages therein communicating the one side of the piston with the reservoir and the other side of the piston with the return line back pressure when the spool valve is in the first position, and communicating the other side of the piston to the reservoir and the one side of the piston to the return line back pressure when the spool valve is in the second position.

5. The improvement in claim 4 wherein said second valve means is located in the return line downstream of the control valve outlet port so as to develop a predetermined back pressure in certain of the valve channels and passages of the first valve means, which pressure is communicated to the other side of the piston in the first position of the first valve means and to the one side of the piston in the second position of the fist valve means.

6. The improvement in claim 5 wherein said second valve means includes two pressure regulating valves, one of the regulating valves maintaining the back pressure on the piston during brake release position and the other of the regulating valves maintaining the back pressure on the piston during brake applied position.

7. The improvement in claim 6 wherein the one regulating valve develops a predetermined pressure of one value which acts on the piston in brake release position and the other regulating valve develops a predetermined pressure of a higher value which acts on the piston in brake applied position.

8. The improvement in claim 5 wherein said second valve means is a pressure regulating valve which maintains the same predetermined pressure on the piston for brake release position as for brake applied position.

9. The improvement in claim 7 wherein the piston and bore together form opposed chambers within the bore;
   said resilient means being a spring located on the one side of the piston in one of the chambers, and the other of the chambers being in communication with the back pressure supply developed by the one regulating valve and acting on the other side of the piston opposing said spring.

10. The improvement in claim 4 having operator-operated means for positioning the spool valve in its second position.

* * * * *